(12) United States Patent
Huber

(10) Patent No.: US 6,425,642 B1
(45) Date of Patent: Jul. 30, 2002

(54) QUICK-RELEASE BICYCLE AXLE WITH THEFT-DETERRENT LOCKING END CAP

(76) Inventor: Lamont Huber, 907 Fifth Ave., Apt. E, New York, NY (US) 10021

( * ) Notice: Subject to any disclaimer, the term of this patent is extended or adjusted under 35 U.S.C. 154(b) by 0 days.

(21) Appl. No.: 09/689,525

(22) Filed: Oct. 13, 2000

Related U.S. Application Data

(63) Continuation-in-part of application No. 09/185,195, filed on Nov. 4, 1998, now Pat. No. 6,152,541, which is a continuation-in-part of application No. 08/741,712, filed on Oct. 31, 1996, now abandoned.

(51) Int. Cl.[7] .............................................. B60B 27/00
(52) U.S. Cl. ................................ 301/124.2; 301/110.5; 70/233
(58) Field of Search .............................. 301/111, 124.1, 301/124.2, 120, 121, 110.5; 70/225, 233; 280/279, 288

(56) References Cited

U.S. PATENT DOCUMENTS 6,241,322 B1 * 6/2001 Phillips .................. 301/124.2

FOREIGN PATENT DOCUMENTS

| FR | 2501124 | * | 9/1982 | ............... 301/124.2 |
| GB | 658726 | * | 10/1951 | ............... 301/124.2 |
| IT | 423500 | * | 8/1948 | ............... 301/124.2 |

* cited by examiner

Primary Examiner—Russell D. Stormer
(74) Attorney, Agent, or Firm—Rothwell, Figg, Ernst & Manbeck

(57) ABSTRACT

The invention features a theft-deterring, quick-release axle apparatus comprising an axle having first end, a second end, and a longitudinal axis; a first, removable end cap disposable on the first end of the axle that includes an end cap body, a bore extending into the end cap body to receive the first end of the axle, and a lock assembly disposed within the end cap body, whereby the first end cap is locked to and unlocked from the first end of the axle as the lock assembly is locked and unlocked, respectively; a first support positioned upon the axle, located medially near the first end; a second end cap disposed at the second end of the axle; a second support positioned upon the axle located medially near said second end; a first friction reducer disposed on the axle, between the first end cap and the first support; a second friction reducer disposed on the axle, between the second end cap and the second support; wherein the first end cap, the second end cap, and the axle rotate around the longitudinal axis of the axle.

5 Claims, 5 Drawing Sheets

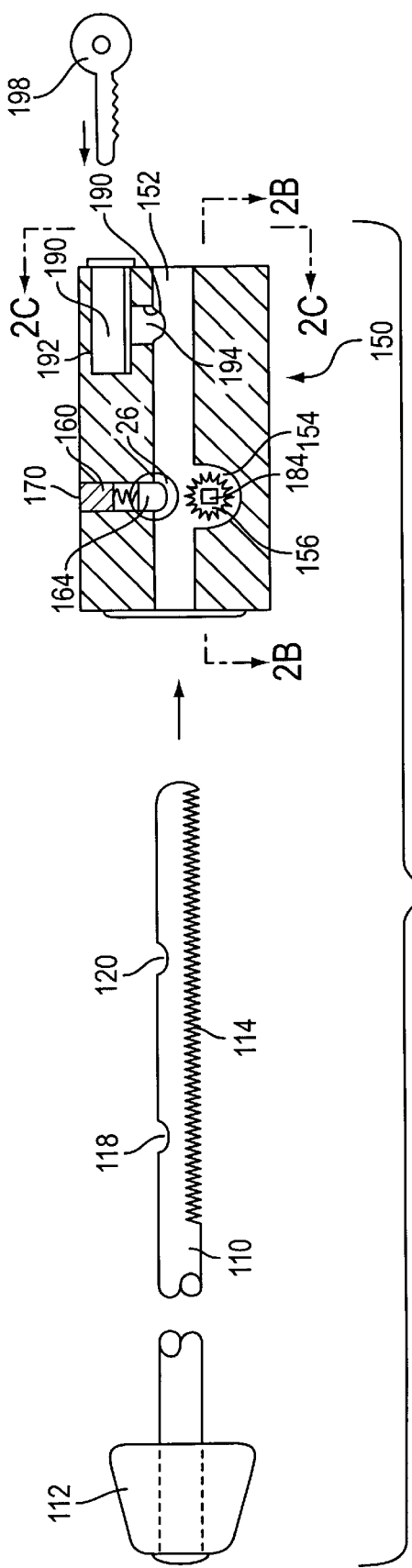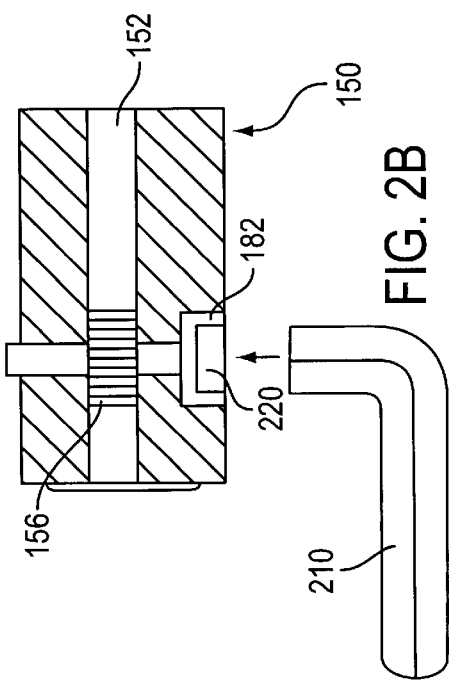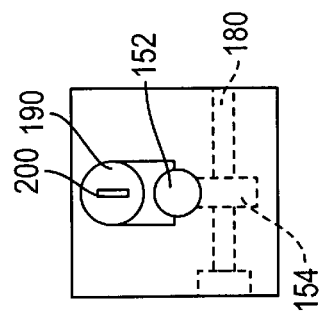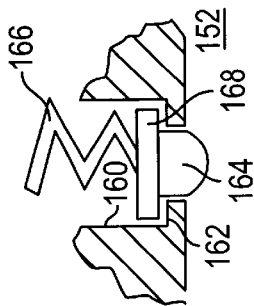
FIG. 2A
FIG. 2B
FIG. 2C
FIG. 2D

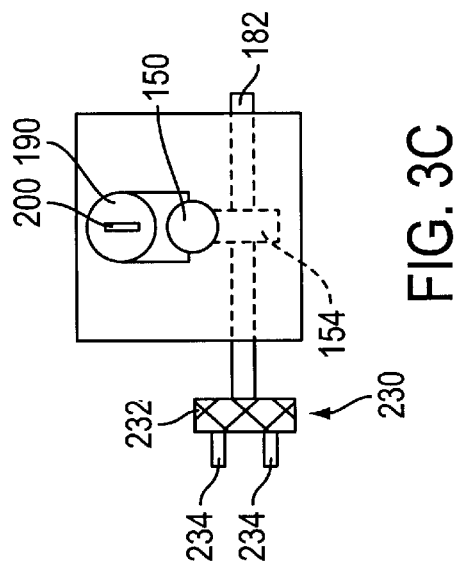
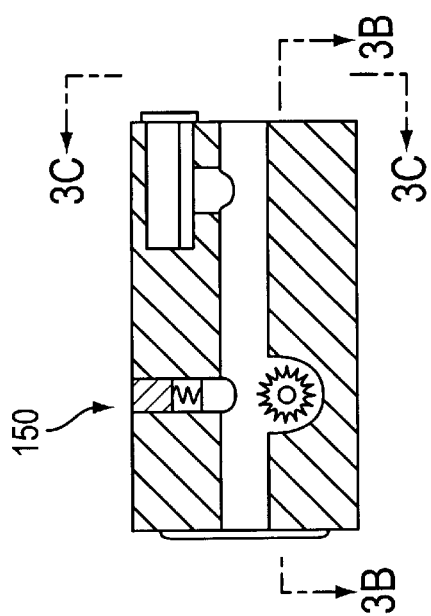
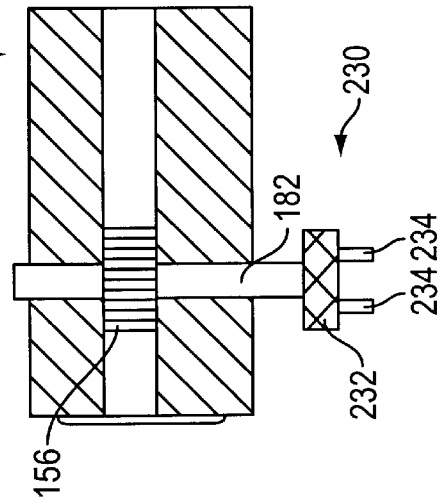

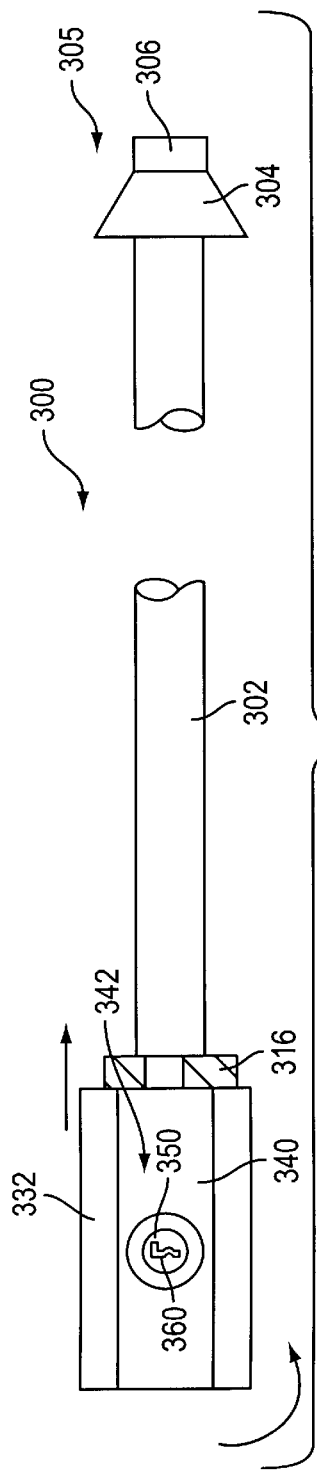
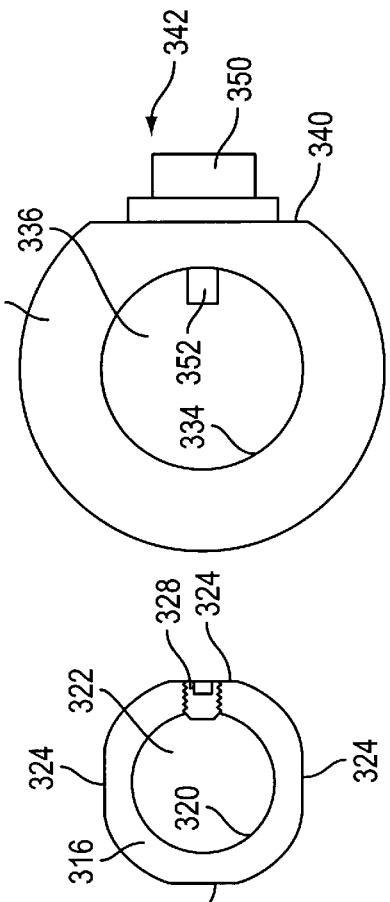
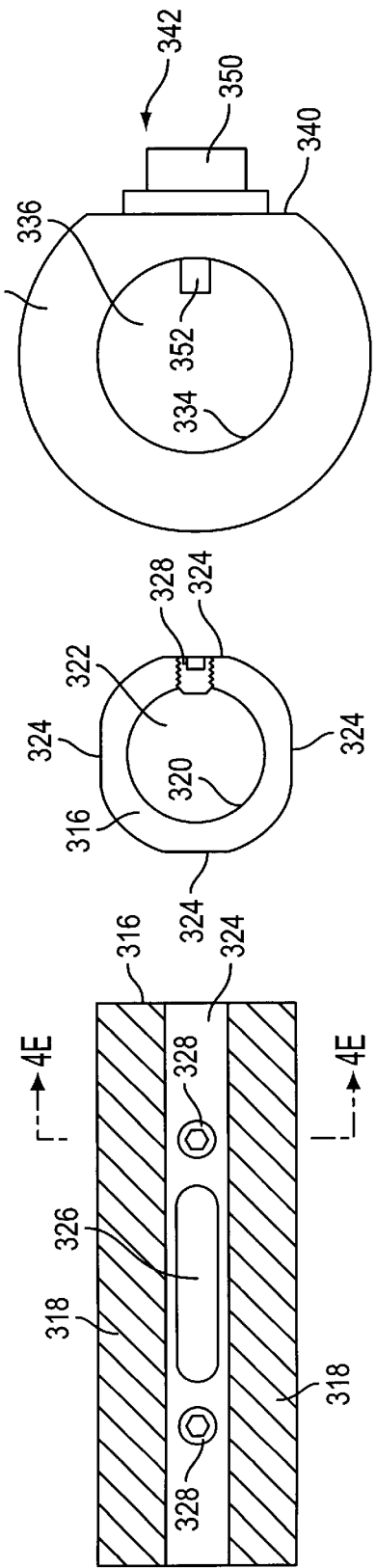
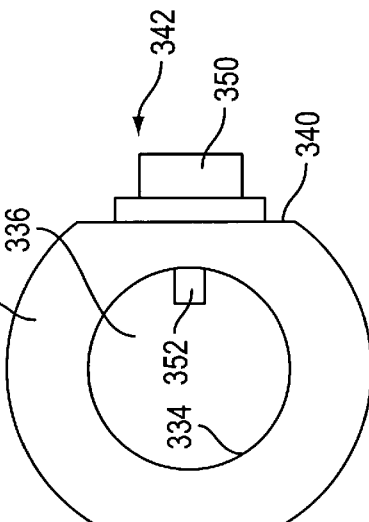

QUICK-RELEASE BICYCLE AXLE WITH THEFT-DETERRENT LOCKING END CAP

CROSS REFERENCE TO RELATED APPLICATIONS

This application is a continuation-in-part of application Ser. No. 09/185,195, filed Nov. 4, 1998, now U.S. Pat. No. 6,152,541 which is a continuation-in-part of application Ser. No. 08/741,712, filed Oct. 31, 1996, now abandoned, both of which have the same inventor as the present application. The disclosure of application Ser. No. 09/185,195 is incorporated herein by reference.

BACKGROUND OF THE INVENTION

The invention relates to quick-release axles which allow a wheel to be removed quickly and easily and, in particular, to quick-release axles which are configured to deter theft.

Quick-release axles, for use on bicycles for example, are well known in the art. In general, as shown in FIG. 5, a quick-release axle 10 supports a hub 11 for rotation about the axle 10. Spokes (not shown) extend from the hub 11 to the rim of the wheel and support the wheel, as is generally known. The axle 10 is threaded at one end 12 and an end cap 14 is threaded onto the threaded end 12.

A quick-release cam mechanism 16 is provided at the opposite end of the axle 10. Although a number of different configurations are known in the art, previously known quick-release axles tend to operate on the same general principle. Specifically, locking lever 18 is used to rotate a shaft 20 which passes through an aperture in the end of the axle 10, which is in turn enclosed within end cap 22. The shaft 20 has a cam surface such that rotating the locking lever 18 and hence the shaft 20 "pulls" the axle 10 further into end cap 22. This causes the inner surfaces 24 and 26 of the end caps 14 and 22, respectively, to bear against the supporting tangs 28 of the structure from which the axle is suspended and squeeze the tangs 28 together slightly to secure the wheel to the fork. Bearing elements (not shown) disposed between the ends of the hub 11 and the fork tangs 28 permit the hub to rotate about the axle 10.

Because quick-release axles are so easily and quickly removed, a number of theft-deterrent mechanisms have been developed and are known in the art. Known theft-deterrent mechanisms all generally work by preventing the cammed actuator from being turned—either by limiting the range of motion of the locking lever 18 or by removably positioning a pin or other blocking means in the shaft 20 to prevent rotation—or by preventing access of the locking lever or an equivalent device to the shaft 20.

A thief may overcome such a theft deterrent mechanism by grasping one end of the axle with a pair of pliers or a similar device and twisting. Since the other end of the axle is solidly attached to the support the theft deterrent mechanism will sustain torsional shear until it snaps. There remains a need for an axle and lock assembly that defeats this strategy.

SUMMARY OF THE INVENTION

The present invention, in contrast, deters theft by allowing a quick-release axle assembly to rotate around the longitudinal axis of the axle. The quick-release axle assembly is formed by permanently affixing an end cap to one end of an axle and by locking an end cap to the other end of the axle. Friction reducing means such as thrust bearings are inserted between each end cap and the axle supports to allow the quick-release axle assembly to rotate freely. The end caps are generally cylindrical and thus offer no convenient surface with which to grasp them. A thief who attempts to break off one of the end caps by applying a torque to it with a pair of pliers, for example, will find that the end cap rotates with the assembly, rather than breaking in shear. This arrangement is thus generally more difficult to circumvent than prior art locking mechanisms.

In particular, the invention features a theft-deterring, quick-release axle apparatus comprising an axle having first end, a second end, and a longitudinal axis; a first, removable end cap disposable on the first end of the axle that includes an end cap body, a bore extending into the end cap body to receive the first end of the axle, and a lock assembly disposed within the end cap body, whereby the first end cap is locked to and unlocked from the first end of the axle as the lock assembly is locked and unlocked, respectively; a first support positioned upon the axle, located medially near the first end; a second end cap disposed at the second end of the axle; a second support positioned upon the axle located medially near said second end; a first friction reducing means disposed on the axle, between the first end cap and the first support; a second friction reducing means disposed on the axle, between the second end cap and the second support; wherein the first end cap, the second end cap, and the axle rotate around the longitudinal axis of the axle.

DESCRIPTION OF THE DRAWINGS

The invention will now be described in greater detail with reference to the following drawings in which:

FIGS. 2A, 2B, and 2C are a schematic view partially in section, a section view along the lines 2B—2B in FIG. 2A, and an end view, respectively, of an example of a quick-release axle with locking end cap suitable for use with an embodiment of the invention;

FIG. 2D is a detail view, partially in section, of the circled portion in FIG. 2A;

FIGS. 3A, 3B, and 3C are a schematic view partially in section, a section view along the lines 3A—3A in FIG. 3, and an end view, respectively, of an alternative configuration of the locking end cap shown in FIGS. 2A, 2B, and 2C;

FIG. 4A is a schematic, side view of a second example of a quick-release axle with locking end cap suitable for use with an embodiment of the invention;

FIG. 4B is a detail view of the end of the axle not visible in FIG. 4A;

FIG. 4C is a section view taken along the lines 4C—4C in FIG. 4B;

FIG. 4D is a detail view of the retention cylinder which is partially visible in FIG. 4A;

FIG. 4E is a section view taken along the lines 4E—4E in FIG. 4D;

FIG. 4F is an end view of the lock ring shown in FIG. 4A; and

DETAILED DESCRIPTION OF THE INVENTION

Figures 1A, 1B, 1C, 1D:
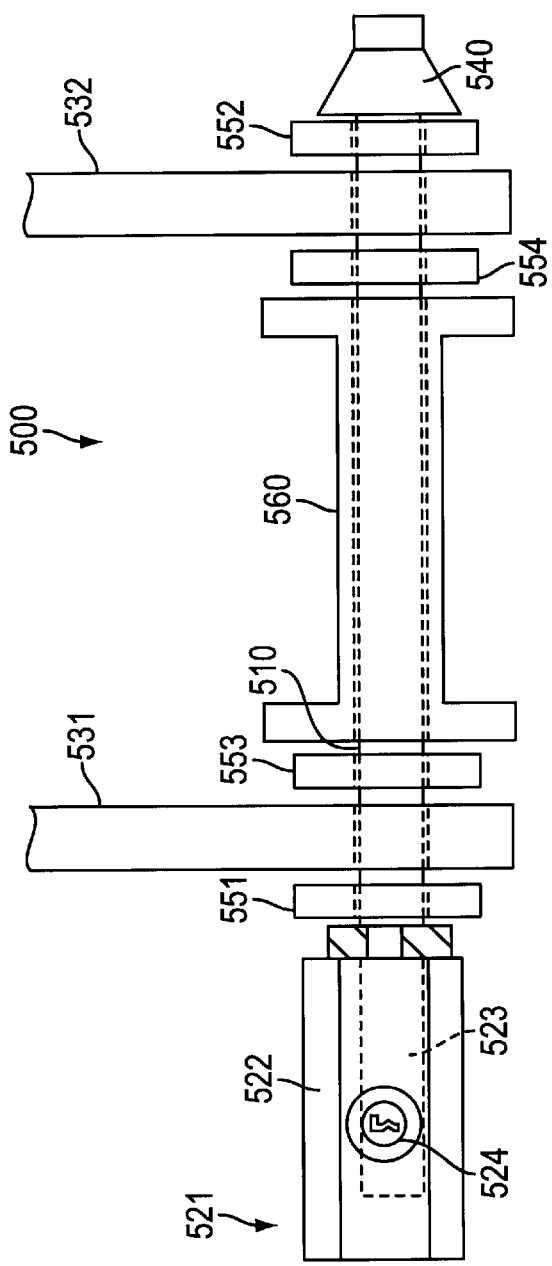
FIG. 1A is a schematic view side view of a quick-release axle with locking end cap and friction reducing means according to an embodiment of the invention.
FIG. 1B is an end view of the embodiment shown in FIG. 1A.
FIG. 1C is a side view of an embodiment of the friction reducing means shown in FIG. 1A.
FIG. 1D is a front view of an embodiment of the friction reducing means shown in FIG. 1A.
Figure 5:
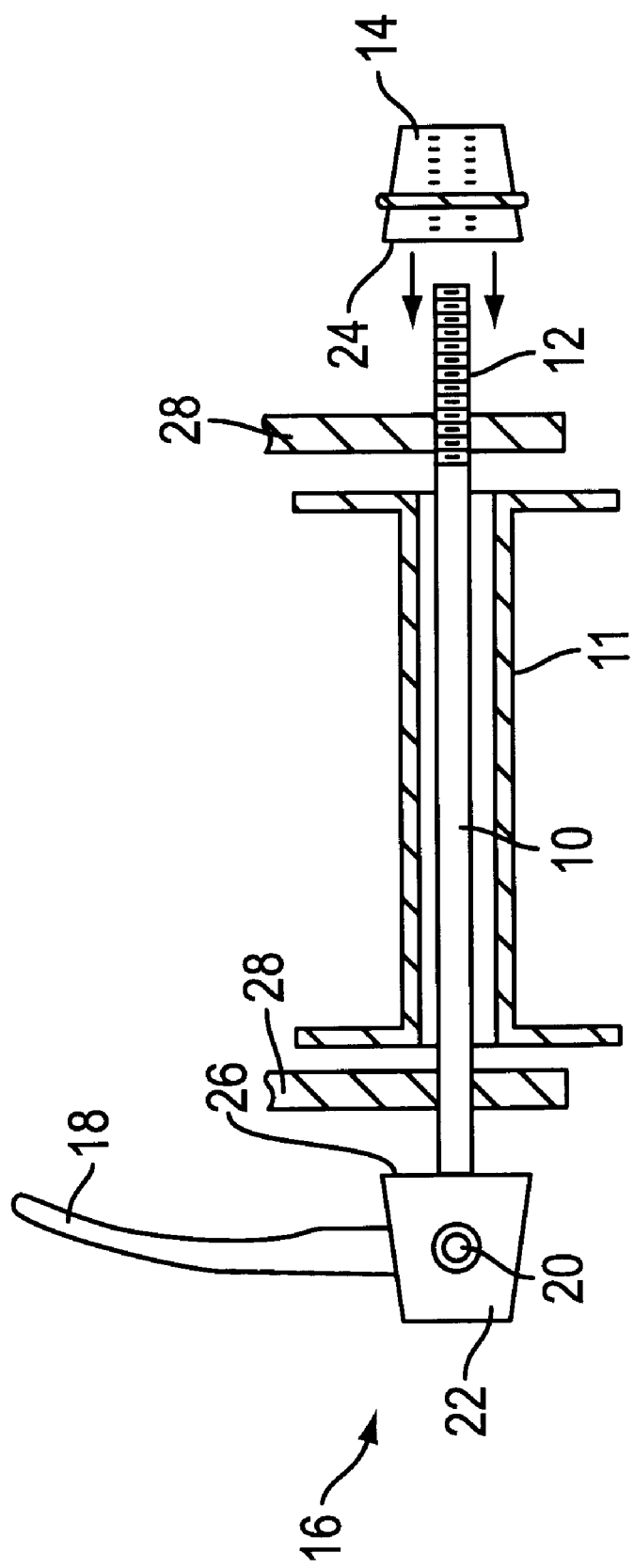
FIG. 5 is a side view, partially in section, showing a quick-release axle as known in the art.

As shown in FIG. 1A, an embodiment of the theft-deterring quick-release axle 500 according to the present invention includes an axle 510 having a first end, a second end, and a longitudinal axis. There is a first, removable end cap 521 on the first end of the axle 510, composed of an end cap body 522, a bore 523 extending into the end cap body 522 to receive the first end of the axle 510, and a lock assembly 524 disposed within said end cap body 522. There is a first support 531 positioned on the axle 510 near the first end of the axle. There is a second end cap 540 disposed at the second end of the axle. In a preferred embodiment the second end cap 540 is permanently fixed to the second end of the axle 510 by spin welding or forging, for example. Also in a preferred embodiment first end cap 521 and second end cap 540 are of generally circular cross-section and have smooth surfaces. A second support 532 is positioned on the axle 510 near the second end of the axle 510. In a preferred embodiment the first and second supports are the forks of a bicycle, but they may be any means of attaching an axle to a vehicle, such as a chassis suspension component like a steering knuckle, a swing-arm, a MacPherson strut, or the like. A first friction reducing means 551 is disposed on the axle 510 between the first end cap 521 and the first support 531, and a second friction reducing means 552 is disposed on the axle 510 between the second end cap 540 and the second support 532. The first friction reducing means 551 reduces friction between the first end cap 521 and the first support 531 such that the quick release axle assembly 500 is able to spin relatively freely about the longitudinal axis of the axle 510. In a similar manner second friction reducing means 552 reduces friction between the second end cap 540 and the second support 532 such that the quick release axle assembly 500 is able to spin relatively freely about the longitudinal axis of the axle 510. In a preferred embodiment the first friction reducing means 551 and the second friction reducing means 552 are realized as thrust bearings. The first friction reducing means 551 and second friction reducing means 552 could, however, be realized as roller bearings, ball bearings, thrust washers, or lubricants, including a low friction surface coating on a washer, or any combination thereof, without deviating from the spirit of the invention. In a preferred embodiment the first friction reducing means 551 and the second friction reducing means 552 are separate components, but first friction reducing means 551 may also be incorporated into the first end cap 521 or, in the alternative, first support 531. Second friction reducing means 552 may likewise be incorporated into the second end cap 540 or, in the alternative, first support 532. In the alternative, first friction reducing means 551 could be made in two halves, with a bearing race or a lubricant, which could be a low friction surface coating, disposed between the two halves, wherein one half is attached to first end cap 521 while the second half is attached to first support 531. In a similar manner, second friction reducing means 552 could be made in two halves, with a bearing race or a lubricant, which could be a low friction surface coating, disposed between the two halves, wherein one half is attached to second end cap 540 while the second half is attached to second support 532.

Also shown in FIG. 1A is a hub 560 disposed on the axle 510 in a conventional manner, with third friction reducing means 553 disposed on: the axle 510 between the hub 560 and the first support 531, and fourth friction reducing means 554 disposed on the axle 510 between the hub 560 and the second support 532. Third friction reducing means 553 and fourth friction reducing means 554 reduce the friction between hub 560, first support 531, and second support 532 so that hub 560 will rotate freely about axle 510, as would be known to one skilled in the art. Although third friction reducing means 553 and fourth friction reducing means 554 are shown in FIG. 1A to be separate components, they may be incorporated into hub 510, first and second supports 531, 532, or a combination thereof, as would be known to one skilled in the art. Friction reducing means to reduce the friction between hub 560 and axle 510 (not shown), may also be incorporated in hub 560, axle 510, or a combination thereof, as would be known to one skilled in the art.

In FIG. 1B is an end view of the embodiment of the theft-deterring quick-release axle of FIG. 1A. In FIG. 1B may be seen axle 510 (in hidden line), first end cap 521, first friction reducing means 551, and first support 531.

Side and front views of first friction reducing means 551 are shown in FIGS. 1C and 1D, respectively. Second friction reducing means 552 is similar.

The theft-deterring quick-release axle according to the present invention works as follows. Second friction reducing means 552 is threaded over axle 510 and moved into close proximity with second end cap 540. Axle 510 is threaded though the axle apertures in second support 532, fourth friction reducing means 554, hub 560, third friction reducing means 553, and first support 531 in consecutive order. First friction reducing means 551 is then placed over the first end of axle 510, followed by locking end cap 521. Axle 510 is drawn into locking end cap 521 and locking end cap 521 is locked by any suitable manner including but not limited to those described in the aforementioned related application Ser. No. 09/185,195 and further described below. If either end cap of the theft-deterring quick-release axle is grasped and turned the entire axle assembly turns, since first friction reducing means 531 and second friction reducing means 532 allow axial rotation of the end cap and axle assembly while the theft-deterring quick-release axle is installed. Grasping both end caps at once and twisting is difficult since first end cap 521 and second end cap 540 are of a substantially circular cross-section and have generally smooth surfaces.

Some examples of locking end caps suitable for use with the present invention follow. These examples are given by way of example, not limitation. Any locking end cap of substantially circular cross-section that allows the quick release axle assembly to rotate about the longitudinal axis of the axle could be incorporated into the present invention., as would be apparent to one skilled in the art.

As shown in FIG. 2A, an example of a locking end cap assembly suitable for use with the embodiment of the quick-release axle with locking end cap shown in FIGS. 1A–1D includes an axle 110 and a locking end cap 150. The axle 110 has an end cap 112 which is joined to one end of the axle and a series of teeth which form a rack gear 114 at the opposite end of the axle. The end cap 112 may be formed as an integral part of the axle or, as shown, may be press fit on the end of. the axle and secured thereto, e.g., by welding. The axle 110 also has a groove 118 and a latch receiving portion such as a groove 120 which are used to position and then secure, respectively, the axle relative to the locking end cap 150, as explained below.

The locking end cap 150 is fashioned from a solid block of metal, e.g., aluminum, and has a longitudinal bore 152 extending through it. A bore recess 154 is formed in one wall of the bore 152, and a pinion gear 156 is disposed in the bore recess such that the teeth of the pinion gear extend into the bore 152.

A counterbore 160 extends into the side of the end cap and extends to the main, longitudinal bore 152 while leaving a retaining shoulder 162 as shown in greater detail in FIG. 2D. A position indicator pin 164 is disposed in the counterbore 160 and is biased by spring 166 to protrude into the main longitudinal bore 152. The indicator pin 164 is restrained by shoulder 168 which abuts retaining shoulder 162 of the counterbore 160. A plug 170 is inserted into the counterbore 160 behind the spring 166 and is permanently secured in place.

The locking end cap 150 has another bore 180 which passes all the way through it and, in particular, through the bore recess 154 as shown in greater detail in FIG. 2C. A pinion gear shaft 182 passes through the counterbore 180 and through a correspondingly shaped aperture 184 in the pinion gear. A spring clip or E-clip (not shown) is secured to the end of the pinion gear shaft to prevent the pinion gear shaft from being withdrawn from the bore 180.

The locking end cap has a plug-type lock 190, e.g., a "church lock," press fit into another bore 192 that is sunk into the end of the end cap as shown in FIG. 2A. A latch member such as a lock pin 194 slides within bore 196 extending between the bore 192 and the main longitudinal bore 152. When key 198 is inserted into slot 200 (see FIG. 2C) and turned to unlock the plug-type lock 190, then lock pin 194 is free to rise within the bore 196 such that its lowermost end no longer protrudes into the longitudinal bore 152. The lock pin 194 has a configuration similar to that of the position indicator pin 164 to restrain it within the bore 196 (see FIG. 2D).

The quick-release axle and locking end cap works as follows. A wheel with a quick-release, theft-deterrent axle according to the invention is mounted to the supporting fork assembly in the same general manner as shown in FIG. 1A, with friction reducing means interposed between the end caps and the supports. The locking end cap 150 is then inserted onto the end of the axle 110 with the bore 152 sliding over the axle. As shown in FIG. 2B, when the pinion gear 156 contacts the end of the axle, Allen wrench 210 is inserted into socket 220 in the end of pinion gear shaft 182 and is used to turn the pinion gear 156 clockwise, as shown in FIG. 2A. This draws the axle 110 further into the bore 152 and hence clamps the tangs of the bicycle fork between the two end caps 112 and 150. (The lock 190 must be unlocked during this operation.such that the lock pin 194 is free to rise within the bore 196 as the end of the axle 110 contacts the lock pin and passes by it.)

When the axle 110 has been drawn into the bore 152 by the proper amount, position indicator pin 164 will click into groove 118, and this clicking can be both felt and heard. Furthermore, lock pin 194 will be engaging groove 120. At this point, the lock 190 is locked using key 198 such that the lock pin 194 is no longer free to rise within the bore 196. Hence, the end cap 150 is securely locked directly to the end of the axle 110, thereby preventing its removal and theft of the wheel.

An alternative configuration of a locking end cap assembly suitable for use with the embodiment of the quick-release axle with locking end cap shown in FIGS. 1A–1D is shown in FIGS. 3A, 3B, and 3C. In this configuration, the pinion gear shaft 182 is provided with a thumbwheel 230 instead of an Allen wrench-receiving socket. The thumbwheel has a knurled surface 232 which provides a good grip, as well as thumb extensions 234 which may be grasped between the thumb and forefinger to turn the pinion gear shaft 182. The end cap configuration shown in FIGS. 3A, 3B, and 3C is otherwise identical to that shown in FIGS. 2A–2D.

A second example of a locking end cap assembly suitable for use with the embodiment of the quick-release axle with locking end cap shown in FIGS. 1A–1D, which operates on generally the same basic principles as the example described above, is shown in FIGS. 4A–4F. In this embodiment 300, the axle 302 has a fixed end cap 304 at one end 305 thereof. The fixed end cap 304 is either integrally formed with the axle 302 or permanently fixed thereto in any convenient fashion. The fixed end cap 304 has a square or hex-shaped lug extension 306, which is used to tighten the axle as explained below. The fixed end cap 304 alternatively may have just a hexagonal socket which receives an Allen-type hex-wrench, or the lug extension 306 may have such a socket.

As shown in FIGS. 4B and 4C, the opposite end 308 of the axle 302 is externally threaded along a portion thereof, as indicated schematically by cross-hatching 310. As shown in FIG. 4C, the externally threaded portion has a flat 312 formed therealong, e.g. by milling the axle 302 before the end 308 has the threads formed on it.

As shown in FIG. 4A, a retention cylinder 316 is screwed onto the externally threaded end 308 of the axle 302. Details of the retention cylinder 316 are shown in FIGS. 4D, 4E and 4F. As indicated schematically by cross-hatching 318 shown in FIG. 4D, the external surface of the retention cylinder 316 is threaded, as is the interior surface 320 (see FIG. 4E) of the bore 322 extending through the retention cylinder 316.

The retention cylinder 316 has four flats 324 formed thereon which are devoid of threads. The flats 324 may be formed, e.g., by milling the external surface of the retention cylinder 316 before the threads are formed thereon. Each of the flats 324 has a latch-receiving, groove-shaped "trough" or "valley" 326 formed therein, e.g. by milling, which extends approximately half-way through the wall of the retention cylinder, as shown in FIG. 4D. Additionally, screw holes extend from at least one of the flats 324 through the wall of the retention cylinder and into the bore 322, and latch members such as set screws 328 are provided therein, as shown in FIGS. 4D and 4E.

As further shown in FIG. 4A, lock ring 332 screws onto the retention cylinder 316. Interior surface 334 of the lock ring bore 336 (see FIG. 4F) is threaded to mate with the threaded exterior surface of the retention cylinder 316.

The lock ring 332 has a flat 340 formed on one side thereof. A key-release, push-button-type lock assembly 342, e.g. model number MPL 201 available from the Royal Lock Corporation in Wauconda, Ill., is screwed into a threaded lock assembly-receiving bore (not shown) extending from the flat 340 through the wall of the lock ring to the bore 336. The lock assembly 342 is secured in place by a pin (not shown) which is tapped into a small hole (not shown) in the side of the lock ring 332 and which extends into a pin-receiving slot or hole in the lock assembly. The pin is secured in the lock ring by means of an interference or friction fit.

In operation, a wheel (e.g., the front wheel of a bicycle) is mounted on and secured to an axle support as follows. Friction reducing means in the manner of the embodiment of the quick-release axle with locking end cap shown in FIGS. 1A–1D is placed on the axle 302. The threaded end 308 of the axle 302 (without the retention cylinder or lock ring) is then passed through the hub of the wheel, and the axle is positioned in the tangs of the fork with the fixed end cap 304 located on the outside of one of the tangs and the threaded end 308 of the axle extending through and beyond the opposite fork tang. (For proper positioning, it may be desirable to put one or more washer-shaped spacer shims over the axle 302, before it is inserted through the hub, so that the spacers are positioned between the fork tang and the fixed end cap 304.) Another friction reducing means is placed over the threaded end 308, and the retention cylinder 316 is then screwed onto the threaded end 308 of the axle 302, with the threaded end of the axle extending into the bore 322 of the retention cylinder 316. The retention cylinder is turned by hand, grasping the fixed end cap 304 with the opposite hand, until it "snugs up against" the friction reducing means. It is then rotated either slightly further, if possible, or backward until the set screws 328 are positioned over the flat 312 on the threaded end 308 of the axle 302. At this point, the set screws are tightened down, e.g. using an Allen-type hex wrench.

The lock ring 332 is then screwed onto and over the retention cylinder 316, as indicated in FIG. 4A. The lock ring 332 is turned by hand until it butts up against the friction reducing means. At this point, the lock ring is screwed down onto the retention cylinder more tightly by grasping the lug extension 306 with a wrench (or inserting the end of a hex wrench into a socket, if provided) and continuing to turn the lock ring by hand. While turning the lock ring, button 350 of the lock assembly 342 is continuously pressed lightly to cause the retractable lock latch 352 (shown as extended) to be pressed toward the interior of the lock ring, i.e., against the surface of the retention cylinder. When the lock ring is rotated to a position such that the latch 352 is located over one of the troughs or valleys 326, the lock latch 352 will extend down into the valley. At this point, the button will remain depressed with the lock latch 352 extending into the valley 326, thereby securing the lock ring to the retention cylinder. Because the lock ring completely covers the set screws 328, which secure the retention cylinder to the threaded end 308 of the axle, the entire assembly is at this point secured to the axle.

The assembly may be subsequently removed by unlocking the lock assembly 342. A key (not shown) is inserted into key slot 360 (FIG. 4A) in the top surface of the button 350 and is rotated. At this point, the button pops back up, withdrawing the latch 352 from the valley 326 and allowing the lock ring to be unscrewed from the retention cylinder. This exposes the set screws 328 so that they may be loosened and so that the retention cylinder can be removed from the axle.

Other embodiments, configurations, and uses will occur to those having skill in the art. For example, the inventive concepts disclosed herein may be employed in a locking, quick-release seat post clamp or on any machine or device having a rotating axis such as an axle engaging the wheels of a car, a hinge attaching the hood, deck lid, or doors of a car to the body, a steering wheel linkage, and the like. Such modifications and uses are deemed to be within the scope of the following claims.

What is claimed is:

1. A theft-deterring, quick-release axle apparatus, said apparatus comprising:

an axle having a first end, a second end, and a longitudinal axis;

a first, removable end cap disposable on the first end of said axle, said removable end cap comprising:

an end cap body, a bore extending into said end cap body to receive the first end of said axle, a lock assembly disposed within said end cap body, whereby said first end cap is locked to and unlocked from the first end of said axle as said lock assembly is locked and unlocked, respectively;

a first support positioned upon said axle, located medially near said first end;

a second end cap disposed at the second end of said axle;

a second support positioned upon said axle located medially near said second end;

a first friction reducing means disposed on said axle, between said first end cap and said first support;

a second friction reducing means disposed on said axle, between said second end cap and said second support;

wherein said first end cap, said second end cap, and said axle rotate around the longitudinal axis of said axle.

2. The theft-deterring, quick-release axle apparatus of claim 1, wherein said first friction reducing means is a thrust bearing.

3. The theft-deterring, quick-release axle apparatus of claim 1, wherein said first friction reducing means is a washer.

4. The theft-deterring, quick-release axle apparatus of claim 1, wherein said second friction reducing means is a thrust bearing.

5. The theft-deterring, quick-release axle apparatus of claim 1, wherein said second friction reducing means is a washer.

* * * * *